(12) United States Patent
Turner

(10) Patent No.: US 8,789,834 B1
(45) Date of Patent: Jul. 29, 2014

(54) SELF-LEVELING AIRBAG SUSPENSION SYSTEM

(76) Inventor: Roy A. Turner, Victorville, CA (US)

( * ) Notice: Subject to any disclaimer, the term of this patent is extended or adjusted under 35 U.S.C. 154(b) by 0 days.

(21) Appl. No.: 13/595,368

(22) Filed: Aug. 27, 2012

Related U.S. Application Data

(60) Provisional application No. 61/528,680, filed on Aug. 29, 2011.

(51) Int. Cl.
*B60G 21/05* (2006.01)

(52) U.S. Cl.
USPC .......... 280/5.508; 280/124.106; 280/124.161; 280/5.514

(58) Field of Classification Search
USPC ............. 280/5.508, 5.509, 124.103, 124.106, 280/124.11, 124.111, 124.16, 124.161
See application file for complete search history.

(56) References Cited

U.S. PATENT DOCUMENTS

| | | | |
|---|---|---|---|
| 1,647,518 A | 11/1927 | Hawley, Jr. | |
| 3,752,497 A | 8/1973 | Enke et al. | |
| 3,894,405 A | 7/1975 | Mielitz | |
| 3,980,316 A * | 9/1976 | Yates | 280/124.106 |
| 4,270,771 A | 6/1981 | Fujii | |
| 4,606,551 A | 8/1986 | Toti et al. | |
| 4,655,440 A | 4/1987 | Eckert | |
| 5,219,152 A | 6/1993 | Derrien et al. | |
| 5,219,181 A | 6/1993 | Lund | |
| 5,447,332 A | 9/1995 | Heyring | |
| 5,562,305 A | 10/1996 | Heyring | |
| 5,601,307 A | 2/1997 | Heyring et al. | |
| 5,794,966 A | 8/1998 | MacLeod | |
| 5,899,472 A * | 5/1999 | Burke et al. | 280/124.106 |
| 6,010,139 A | 1/2000 | Heyring et al. | |
| 6,220,613 B1 | 4/2001 | Franzini | |
| 6,270,098 B1 | 8/2001 | Heyring et al. | |
| 6,318,742 B2 | 11/2001 | Franzini | |
| 6,338,014 B2 | 1/2002 | Heyring et al. | |
| 6,517,094 B1 * | 2/2003 | Kincaid et al. | 280/124.106 |
| 6,519,517 B1 | 2/2003 | Heyring et al. | |
| 6,619,445 B2 | 9/2003 | Forster | |
| 6,761,371 B1 | 7/2004 | Heyring et al. | |
| 6,834,865 B1 * | 12/2004 | Lin | 280/5.507 |

(Continued)

FOREIGN PATENT DOCUMENTS

WO  WO 2004/076211  9/2004

OTHER PUBLICATIONS

Buzzle.com, *Air Suspension System*, www.buzzle.com/editorials/1-31-2005-65105.asp.

*Primary Examiner* — Paul N Dickson
*Assistant Examiner* — Timothy Wilhelm
(74) *Attorney, Agent, or Firm* — Workman Nydegger

(57) ABSTRACT

A vehicle suspension system includes: a plurality of wheels; a first primary airbag having a compartment with a volume; a second primary airbag having a compartment with a volume; a first secondary airbag having a compartment with a volume; a second secondary airbag having a compartment with a volume; a first gas line extending in fluid communication between the compartment of the first primary airbag and the compartment of the second secondary airbag; a second gas line extending in fluid communication between the compartment of the second primary airbag and the compartment of the first secondary airbag; and an axle assembly supported by the plurality of wheels for compressing or expanding the airbags as different loads are applied to the wheels to facilitate the transfer of gas between the airbags through the first and second gas lines.

18 Claims, 5 Drawing Sheets

(56) References Cited

U.S. PATENT DOCUMENTS

| | | |
|---|---|---|
| 6,929,271 B2 * | 8/2005 | Trotter et al. .......... 280/124.106 |
| 6,978,872 B2 | 12/2005 | Turner |
| 7,150,457 B2 | 12/2006 | Rautenbach |
| 7,240,906 B2 | 7/2007 | Klees |
| 7,384,054 B2 | 6/2008 | Heyring et al. |
| 7,413,064 B2 | 8/2008 | Furuya |
| 7,740,256 B2 | 6/2010 | Davis |
| 7,946,599 B2 * | 5/2011 | Lloyd .................... 280/124.106 |
| 8,006,988 B1 | 8/2011 | Turner |
| 8,204,657 B2 * | 6/2012 | Buszek et al. .................. 701/51 |
| 8,490,952 B1 * | 7/2013 | Vogel et al. ................. 267/64.27 |

* cited by examiner

SELF-LEVELING AIRBAG SUSPENSION SYSTEM

CROSS-REFERENCE TO RELATED APPLICATIONS

This application claims the benefit of U.S. Provisional Application No. 61/528,680, filed Aug. 29, 2011, which is incorporated herein by specific reference.

BACKGROUND OF THE INVENTION

The Field of the Invention

The present invention relates to self-leveling airbag suspension systems for use with vehicles.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
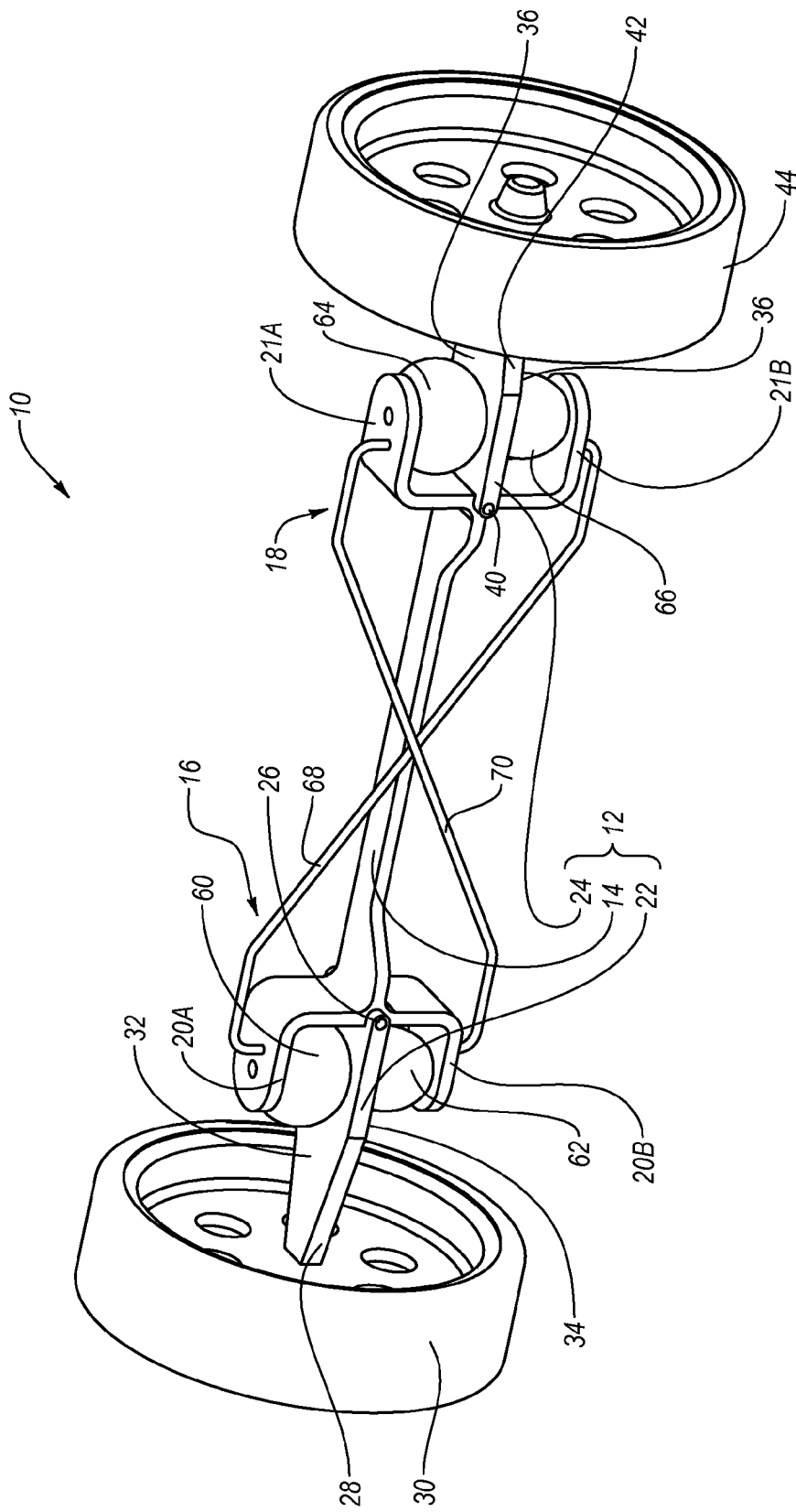
FIG. 1 is a perspective view of one embodiment of an inventive suspension system.

The present invention relates to self-leveling, airbag, suspension systems. The inventive suspension systems can be used on any multi-wheeled vehicle such as a car, truck, ATV, trailer, or the like. Depicted in FIG. 1 is one embodiment of an inventive suspension system 10 incorporating features of the present invention. Suspension system 10 comprises an axle assembly 12 that includes a central body 14 having a first end 16 and an opposing second end 18. First end 16 is forked having a substantially U-shape that includes spaced apart support arms 20A and 20B that are disposed in substantially parallel alignment. Second end 18 is similarly forked having a substantially U-shape that includes spaced apart support arms 21A and 21B that are disposed in substantially parallel alignment.

Axle assembly 12 further includes a first transfer arm 22 mounted to first end 16 of central body 14 and a second transfer arm 24 mounted to second end 18 of central body 14. More specifically, first transfer arm 22 has a first end 26 that is hingedly mounted to central body 14 between support arms 20A and 20B. First transfer arm 22 also has an opposing second end 28 that is coupled to a first wheel 30 so that first wheel 30 can freely rotate relative to first transfer arm 22. In the embodiment depicted, first transfer arm 22 is shown as having an elongated plate-like configuration with opposing faces 32 and 34 that are substantially flat and in parallel alignment. In alternative embodiments, however, first transfer arm 22 need not be flat but can have a circular, polygonal, or other transverse cross section.

Second transfer arm 24 has the same configuration as first transfer arm 22 and is similarly mounted to second end 18 of central body 14. Specifically, second transfer arm 24 has opposing faces 36 and 38 that extend between a first end 40 that is hingedly mounted to central body 14 between support arms 21A and B. Second transfer arm 24 also has a second end 42 that is coupled to a second wheel 44 so that second wheel 44 can freely rotate on second transfer arm 24.

Figure 2:
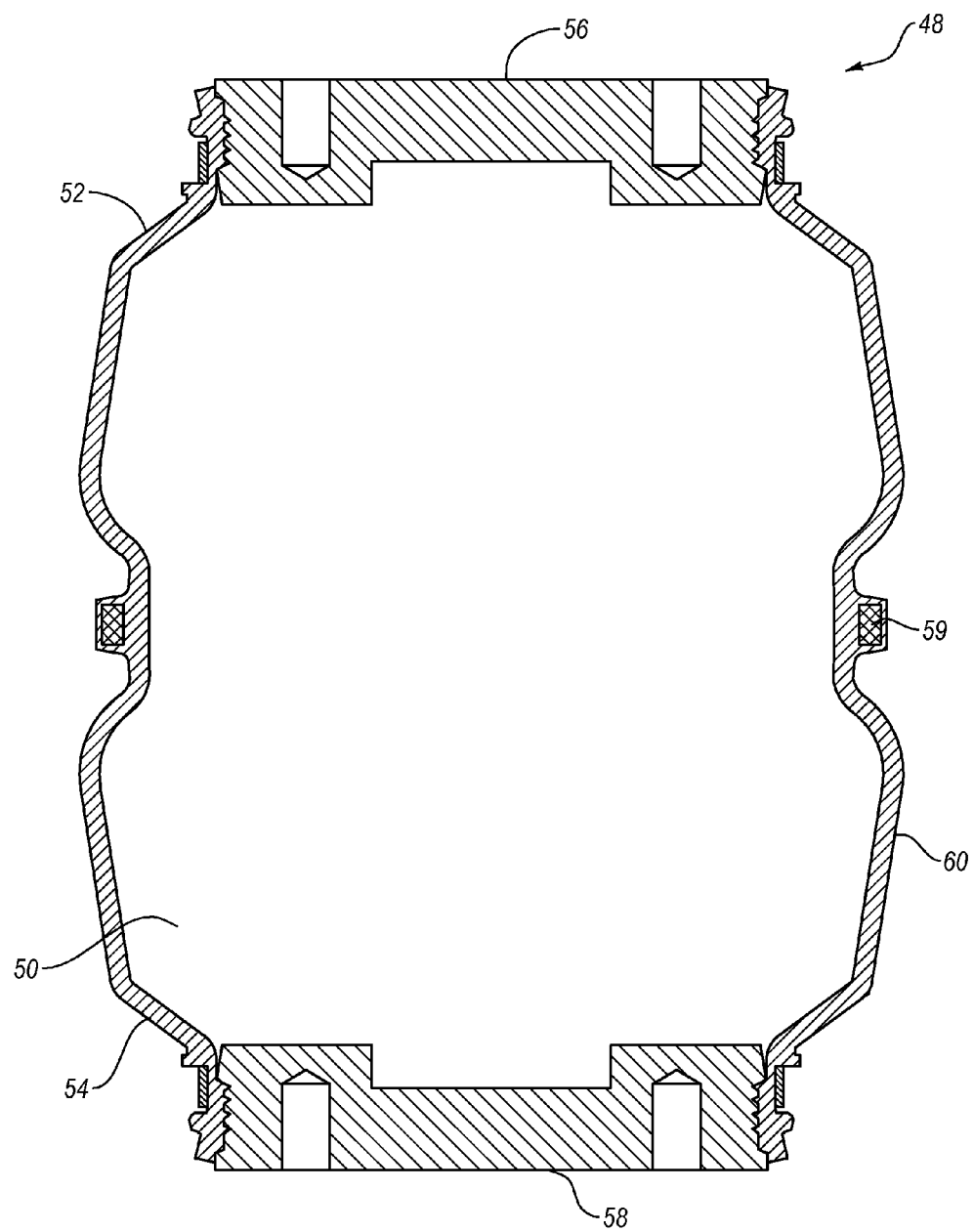
FIG. 2 is a cross sectional side view of an airbag used in the suspension system.

Suspension system 12 further includes a plurality of airbags. As used in the specification and pending claims, "airbags" is intended to mean vehicle suspension airbags such as those that are commonly known in the art. Depicted in FIG. 2 is a cross sectional side view of a conventional airbag 48. Airbag 48 comprises a tubular sleeve 50 that extends from a first end 52 to an opposing second end 54. Sleeve 50 is typically made of a high strength elastomeric or flexible material such as rubber or other elastomer. A first end cap 56 is mounted on first end 52 of sleeve 50 while a second end cap 58 is mounted to second end 54 of sleeve 50. End caps 56 and 58 are typically mounted to sleeve 50 by crimping, clamping, fasteners, or the like so that the end caps 56 and 58 seal the ends of sleeve 50 closed. End caps 56 and 58 are typically comprised of metal but can also be made of other high strength materials. A support wire 59 can centrally encircle sleeve 50. Sleeve 50 and end caps 56 and 58 bound a sealed compartment 60 having a volume that is filled with a gas, typically air. Sleeve 50 is sufficiently strong so that when acting in concert with other airbags, the airbags can support the weight of a vehicle chassis while providing an air cushion. Conventional airbags are available from manufactures such as Firestone, Goodyear, and Arnott, Inc.

Returning to FIG. 1, a first primary airbag 60 is disposed between first transfer arm 22 and support arm 20A. A first secondary airbag 62 is disposed between first transfer arm 22 and support arm 20B. Similarly, a second primary airbag 64 is disposed between second transfer arm 24 and support arm 21A while a second secondary airbag 66 is disposed between second transfer arm 24 and support arm 21B. Each of airbags 60, 62, 64, and 66 bound a sealed compartment that has a volume. As discussed below in greater detail, the volume of the compartment of the first primary airbag 60 is typically larger than the volume of second secondary airbag 66 and the volume of the compartment of the second primary airbag 64 is typically larger than the volume of first secondary airbag 62. Although not necessarily required, first primary airbag 60 and second primary airbag 64 typically have the same volume while first secondary airbag 62 and second secondary airbag 66 typically have the same volume. A first gas line 68 extends in open fluid communication between first primary airbag 60 and second secondary airbag 66. Similarly, a second gas line 70 extends in open fluid communication between second primary airbag 64 and first secondary airbag 62.

As discussed above, suspension system 10 is used for self-leveling of a vehicle during operation of the vehicle. For example, when a conventional automobile makes a hard left turn, the conventional shock absorbers on the front and rear right side are compressed while the shock absorbers on the front and rear left side are extended, thereby giving a tilt to the automobile. Assuming in FIG. 1 that first wheel 30 is on the left side if the vehicle and that second wheel 44 is on the right side if the vehicle, when an automobile that incorporates suspension system 10 makes a hard left turn, second end 18 of central body 14 is forced downwardly causing end 40 of second transfer arm 24 to pivot so that second primary airbag 64 is compressed between second transfer arm 24 and support arm 21A. As also a result of the pivoting of second transfer arm 24, second secondary airbag 66 is expanded or is otherwise free to expand between second transfer arm 24 and support arm 21B. Likewise, as a result of the hard left turn, first end 16 of central body 14 is forced upward causing first transfer arm 22 to pivot so that first secondary airbag 62 is compressed and first primary airbag 60 is expanded.

Due to the difference in size between airbags 62 and 64 (as discussed below) and the different forces that are being applied to the air bags, at almost any given time in the turn, one of airbags 62 or 64 is being subject to a greater compressive force than the other. Assuming second primary air bag 64 is being subject to the greater compressive force, as second primary airbag 64 is compressed, gas therein is forced out of the chamber within airbag 64, passed through second gas line 70, and enters into first secondary airbag 62 so as to further inflate or expand first secondary airbag 62. In turn, as first secondary airbag 62 expands, it pushes up on first transfer arm 22 which has pivoted down due to the elevation of first end 16 of central body 14 caused by the left turn. The pushing of airbag 62 against transfer arm 22 causes transfer arm 22 to pivot in an opposite direction than that caused by the left turn which results in first end 16 of central body 14 being automatically lowered, thereby leveling central body 14 and thus leveling the resulting vehicle. In contrast, if airbag 62 is subject to a greater compressive force than airbag 64, air travels from airbag 62 to airbag 64, thereby expanding airbag 64 and automatically raising second 18 of central body 14 so as to level the vehicle.

Once the vehicle has finished with the turn, forces on the airbags are redistributed and the vehicle returns to its normal level orientation. Should the vehicle make a sharp right turn, the reverse adjustment of the airbags would occur which would also result in assisting in the automatic leveling of the vehicle. For example, a hard right turn causes the compression of airbags 60 and 66. Depending on which is being compressed more, the air travels to the other airbag to automatically level the vehicle. The same principal also applies if only one airbag is being compressed, such as when a tire hits a pot hole.

It is noted that suspension system 10 is configured so that when the automobile is at a resting state, the weight of the vehicle chassis is distributed directly against the primary or larger airbags 60 and 64. Secondary airbags 62 and 66 are smaller than primary airbags 60 and 64 so that when the suspension system 10 is in the resting position, suspension system 10 does not simply collapse. For example, if all of airbags 60, 62, 64, and 66 were identical, the weight of the vehicle chassis, which rests of central body 14, could cause primary airbags 60 and 64 to completely collapse and secondary airbags 62 and 66 to expand to contain the volume of gas removed from primary airbags 60 and 64. This would make the suspension system non-functional as it would no longer provided air cushioning nor assist in self-leveling.

In contrast, however, by making secondary airbags 62 and 66 sufficiently smaller than primary airbags 60 and 64, secondary airbags 62 and 66 cannot accept all of the gas compressed from the primary airbags 60 and 64 under the weight of the vehicle chassis and the load applied thereto. As such, gas always remains in both the primary and secondary airbags which permits air cushioning and self-leveling. It is appreciated, however, that in some situations the suspension system can still work when all of the airbags are the same size. For example, the secondary airbags could be the same size as the primary airbags if the airbags are made from materials or have designs that would preclude their expansion to hold the volume of both airbags under the weight of the chassis and other loads that may be applied thereto. One specific example is that the primary and secondary airbags could have the same volume but be made of sleeves having different elastomeric properties. That is, the sleeve in the secondary airbags could be stiffer and thus not expand as easy as the sleeve in the primary airbags.

Figure 3:
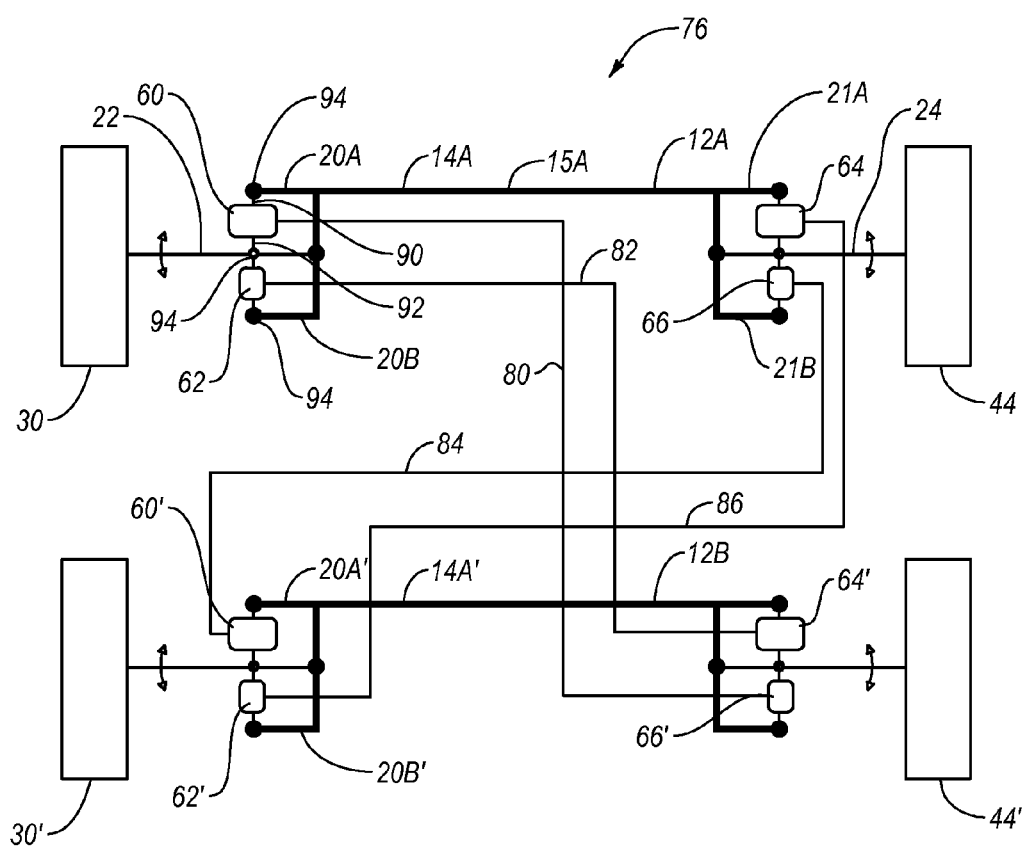
FIG. 3 is a schematic representation of an alternative embodiment of a suspension system incorporating a front and back axle.

The example in FIG. 1 shows a single axle suspension system which could be either a front axle or rear axle of a vehicle. In another embodiment, it is also appreciated that that the front and rear axle suspension systems can be combined. For example, depicted in FIG. 3 is a suspension system 76. Suspension system 76 includes a first axle assembly 12A and a spaced apart second axle assembly 12B. Axle assembly 12A is substantially the same as axle assembly 12 shown in FIG. 1 except that axle assembly 12A has a central body 14A with a cross member 15A that extends between the upper ends of the forked ends as opposed to centrally between the forked ends as depicted in FIG. 1. Otherwise, like elements between axle assembly 12 and axle assembly 12A are identified by like reference characters. In turn, axle assembly 12B is identical to axle assembly 12A with all parts referenced by the same reference characters except with the addition of a prime (') symbol.

In this embodiment first primary airbag 60 on axle assembly 12A is coupled by a gas line 80 to second secondary airbag 66' on axle assembly 12B. Likewise, first secondary airbag 62 on axle assembly 12A is coupled by a gas line 82 to second primary airbag 64' on axle assembly 12B. In the same fashion, a gas line 84 is used to fluid couple first primary airbag 60' on axle assembly 12B to second secondary airbag 66 on axle assembly 12A while a gas line 86 is used to couple first secondary airbag 62' on axle assembly 12B with second primary airbag 64 on axle assembly 12A. As a result of this cross coupling between the airbags, suspension system 76 again facilitates self leveling of the vehicle as the vehicle is tilted through applied loads such as sharp turns or bumps.

Also in contrast to the embodiment shown in FIG. 1, it is noted that various airbags need not be disposed directly against the transfer arms and the support arms. For example, as shown in FIG. 3, extension arms 90 and 92 can project from opposing ends of each airbag and couple with corresponding transfer arms and support arms. If desired, extension arms 90 and 92 can be coupled to the support arms and transfer arms by hinges 94 which are identified in the drawings by circles.

In one embodiment of the present invention, means which are supported by the plurality of wheels are provided for compressing or expanding the airbags as different loads are applied to the wheels to facilitate transfer of gas between the airbags through the gas lines. Examples of such means can include axle assembly 12, 12A, and 12B as discussed above.

Figure 4:
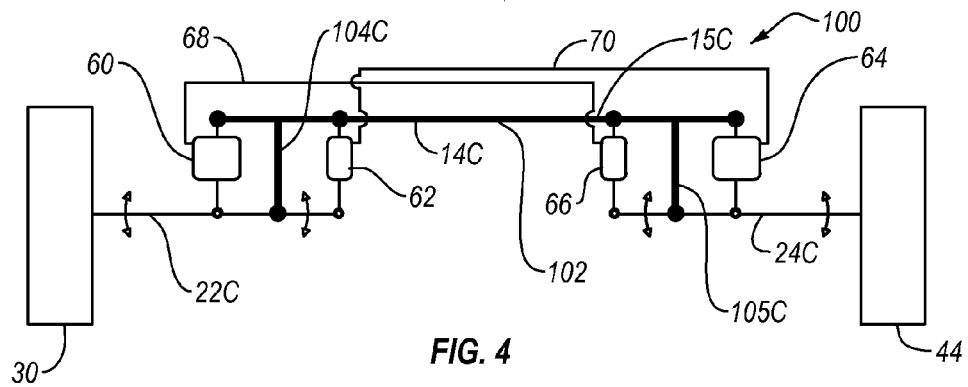
FIGS. 4-6 are schematic representations of alternative embodiments of suspension systems having different axle assemblies.

As set forth below, it is likewise appreciated that a variety of other axle assemblies can also be used which are also examples of the means. For example, depicted in FIG. 4 is a suspension system 100 which includes an axle assembly 102. Axle assembly 102 includes a central body 14C having transfer arms 22C and 24C mounted on the ends thereof. Central body 14C includes a cross member 15C having risers 104C and 105C that project down from opposing ends of cross member 15C and hingedly couple with transfer arms 22C and 24C, respectively. Airbags 60, 62, 64 and 66 extend between central body 14C and transfer arms 22C and 24C so that the airbags are again compressed or expanded during turning of the related vehicle to facilitate automatic self-leveling.

Figure 5:
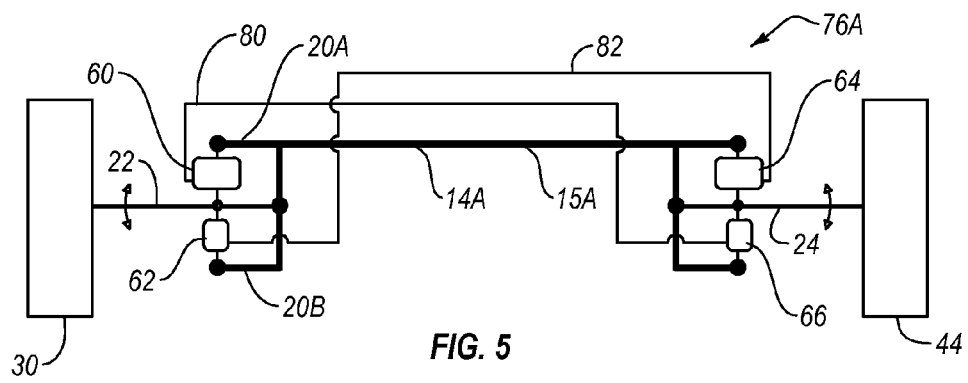

Depicted in FIG. 5 is a suspension system 76A which is the same as suspension system 76 in FIG. 3 except that the gas lines extend between the airbags on the same axle assembly.

Figure 6:
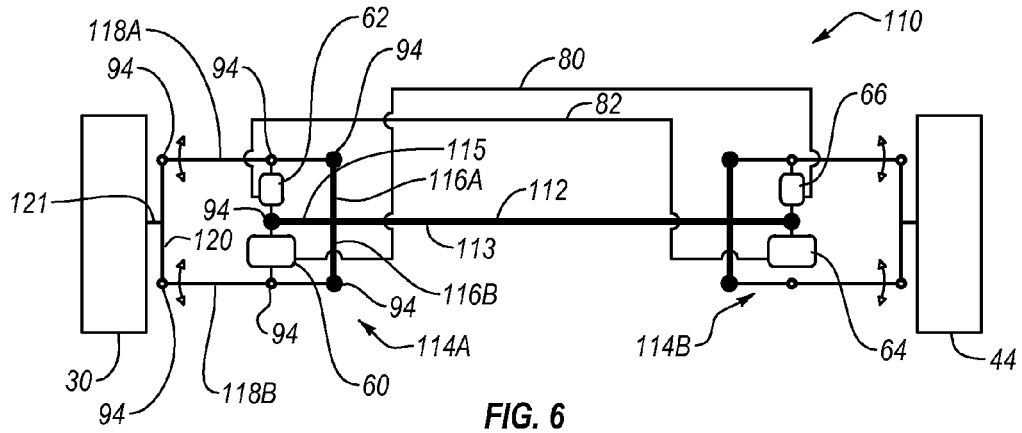

FIG. 6 is a view of yet another alternative embodiment of a suspension system 110 which includes a modified axle assembly 112 for use with the airbags to accomplish the same self-leveling as discussed in the above embodiments. Specifically, axle assembly 112 comprises an elongated central body 113 that extends between a first end 114A and an opposing second end 114B. First end 114A terminates at a terminus 115. Risers 116A and B vertically project in opposite directions at a location at first end 114A that is spaced back from terminus 115. A first end of a first transfer arm 118A is hingedly mounted to the end of riser 116A while a first end of a second transfer arm 118B is hingedly mounted to the end of riser 116B. A connecting arm 120 extends between opposing second ends of transfer arms 118A and 118B and is hingedly coupled thereto. A stem 121 extends from connecting arm 120 onto which wheel 30 is rotatably connected. Axle assembly 112 has the same configuration at second end 114B that it has at first end 114A.

First primary airbag 60 is disposed between and hingedly connected to terminus 115 and transfer arm 118B while first secondary airbag 62 is disposed between and hingedly connected to terminus 115 and transfer arm 118A. Second primary airbag 64 and second secondary airbags 66 are similarly positioned at second end 114. Gas line 80 extends between airbags 60 and 66 while gas line 82 extends between airbags 62 and 64.

Suspension system 110 operates in substantially the same fashion as the other suspension systems disclosed herein. For example, again if suspension system 110 is subject to a hard left turn, central body 113 tilts causing the compression of second primary airbag 64. In turn, gas transfers through gas line 82 to first secondary airbag 62. The expansion of first secondary airbag 62 causes the lowering of first end 114A of central body 113 so as to help level the chassis connected to axle assembly 112.

Figure 7:
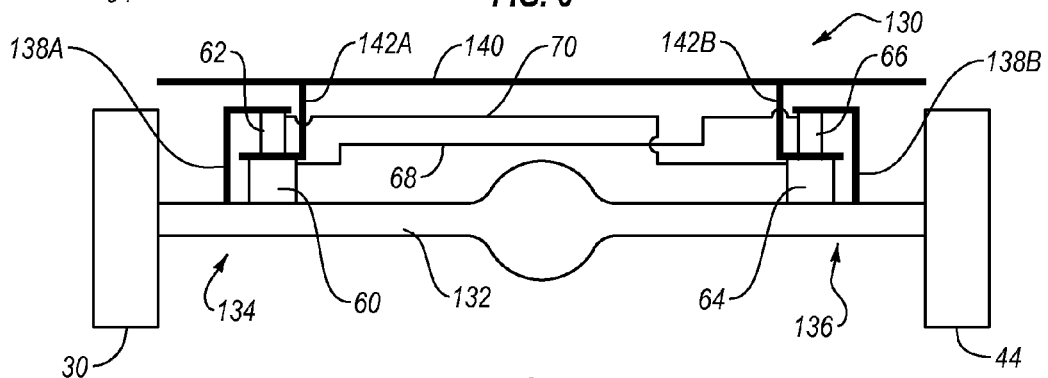
FIG. 7 is a schematic representation of a suspension system mounted on a drive axle.

Depicted in FIG. 7 is another alternative embodiment of a suspension system 130. Suspension system 130 includes an axle 132 that extends between a first end 134 and an opposing second end 136. First end 134 of axle 132 couples with wheel 30 while second end 136 couples with wheel 44. First and second axle mounts 138A and 138B upwardly projects from opposing ends of axle 132 at the opposing ends thereof. A vehicle chassis 140 is also depicted having a first frame mount 142A and a second frame mount 142B downwardly projecting therefrom. First primary airbag 60 is disposed between frame mount 142A and axle 132 while first secondary airbag 62 is disposed between frame mount 142A and axle mount 138A. Similarly, second primary airbag is disposed between frame mount 142B and axle 132 while second secondary airbag 66 is disposed between axle mount 138B and frame mount 142B. Gas lines 68 and 70 extend between the same airbags as previously discussed. Again in this embodiment, the airbags are compressed or expanded between the frame mount and axle mount or between the frame mount and the axle during turning of a vehicle incorporating suspension system 130 so that the airbags facilitate self-leveling of the vehicle.

Figure 8:
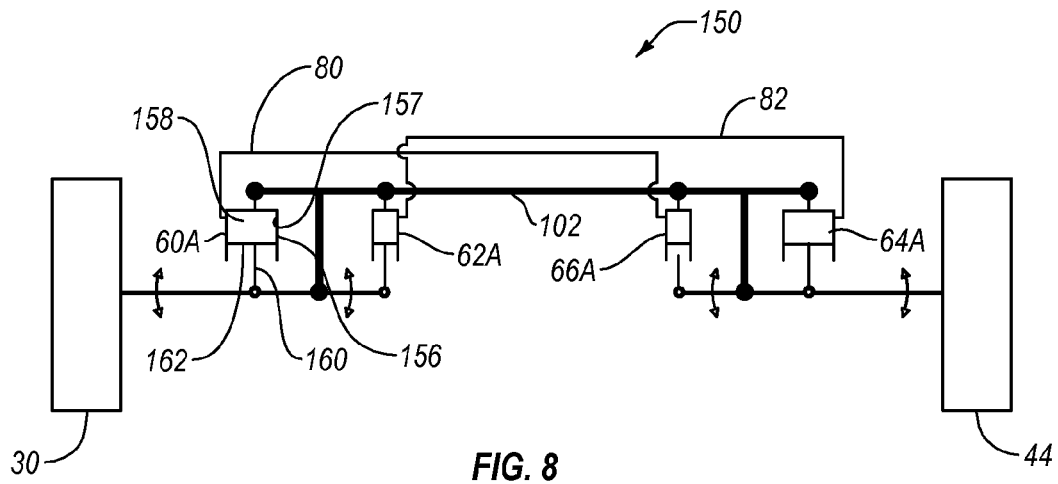
FIGS. 8-10 are schematic representations of alternative embodiments of suspension systems depicted in FIGS. 4-6 wherein the airbags have been replaced by pneumatic air pistons.
Figure 9:
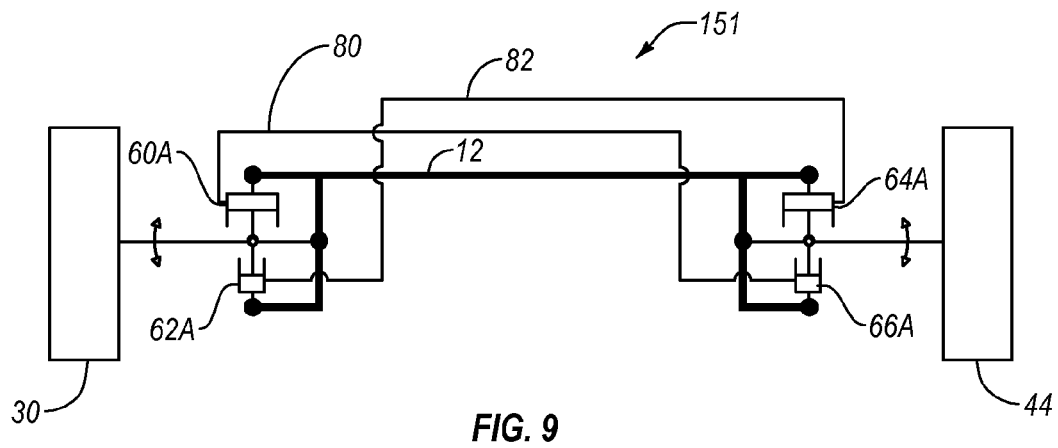
Figure 10:
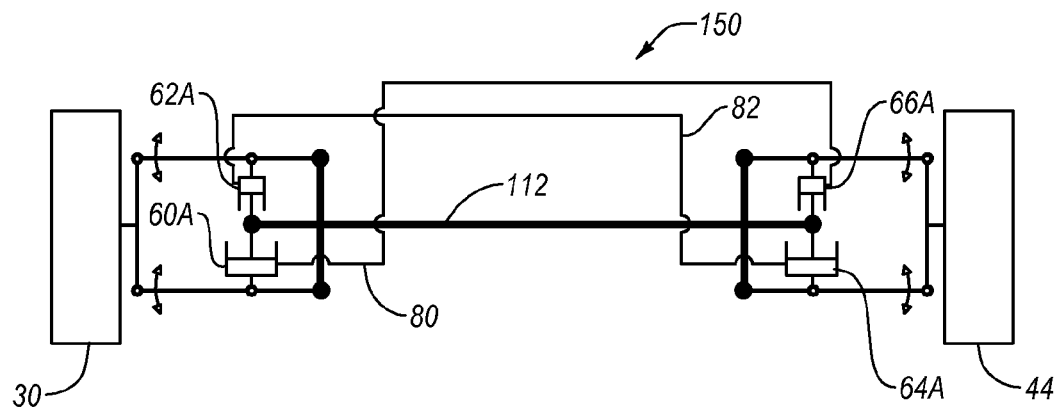

Depicted in FIGS. 8-10 are alternative suspension systems 150-152 which have the same axle assemblies as depicted in FIGS. 4-6, respectively, but wherein the airbags have been replaced with conventional pneumatic air pistons. For example, in FIG. 8 first primary airbag 60 is replaced with a first primary air piston 60A, first secondary airbag 62 is replaced with a first secondary air piston 62A, second primary airbag 64 is replaced with a second primary air piston 64A and second secondary airbag 66 is replaced with a second secondary air piston 66A. Each air piston includes a housing 156 having an interior surface 157 that bounds a chamber 158. A piston 160 is slidably positioned within housing 156 and has a piston head 162 that seals against interior surface 157 so as to bound chamber 158. Gas line 80 extends between the compartments of air piston 60A and 66A while gas line 82 extends between the compartments of air pistons 62A and 64A.

The turning or other movement of a vehicle containing suspension systems 150-152 causes the compression or expansion of the air pistons in the same manner as the airbags are compressed or expanded as discussed above. In turn, the gas traveling through the gas lines to expand or contract the air pistons coupled thereto causes self-leveling of the suspensions systems in the same manner as discussed above with regard to use of the airbags. Accordingly, the present systems help to automatically level a vehicle by having one side of the vehicle mimic the elevation or movement of the other side of the vehicle. Furthermore, by having the various chambers filled with a gas, as opposed to a hydraulic fluid, the gas compresses and expands so as to form a resilient spring that helps to more smoothly control the movement of the vehicle. In alternative embodiments, it is appreciated that the gas lines between the different compartments can be positioned in a variety of different arrangements. For example, in each embodiment the gas lines can extend corner to corner in a vehicle, as shown in FIG. 3, or can extend side to side on a vehicle, as shown in FIGS. 4-10. Other combinations can also be used.

In all of the above discussed embodiments, it is appreciated that the inventive self-leveling suspension systems will be used in association with conventional shock absorbers for each wheel. However, the disclosed self-leveling suspension systems can be used independently of any other suspension springs, such as leaf or coil springs, that are traditionally used to support the vehicle chassis on the axles. If desired, however, the disclosed self-leveling suspension systems can be used in conjunction with other suspension springs. For example, where the front of a vehicle is heavier than the rear of a vehicle, suspension springs may be used at the front of the vehicle in conjunction with the self-leveling suspension system. In the rear of the vehicles, however, the self-leveling suspension system can be used independent of suspension springs. This varied use of suspension springs can provide a more uniform suspension to the overall vehicle. In contrast to using suspension springs beyond those found in shock absorbers, the suspension can be adjusted by regulating the properties of the different air bags and air pistons. For example, the secondary air bags 62 and 66 can be smaller than or made of a less flexible material than the secondary air bags 62' and 66' used at the rear of the vehicle. Thus, air bags and air pistons of different sizes and flexibility can be used in a single vehicle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle suspension system comprising:

a first primary airbag having a compartment with a volume;

a second primary airbag having a compartment with a volume;

a first secondary airbag having a compartment with a volume, the volume of the compartment of the first secondary airbag being smaller than the volume of the compartment of the second primary airbag;

a second secondary airbag having a compartment with a volume, the volume of the compartment of the second secondary airbag being smaller than the volume of the compartment of the first primary airbag;

a first gas line extending in fluid communication between the compartment of the first primary airbag and the compartment of the second secondary airbag;

a second gas line extending in fluid communication between the compartment of the second primary airbag and the compartment of the first secondary airbag;

a first axle assembly having a first end and an opposing second end with a wheel mounted on each end, the first primary airbag and first secondary airbag being coupled to the first axle assembly at or toward the first end thereof; and a second axle assembly spaced apart from the first axle assembly and having a first end and an opposing second end with a wheel mounted on each end, the second primary airbag and second secondary airbag being coupled to the second axle assembly at or toward the second end thereof, the second end of the second axle assembly being located at an end opposite to the first end of the first axle assembly.

2. The vehicle suspension system as recited in claim 1, further comprising a first portion of the first axle assembly being movable between a first position and a second position, the first primary airbag and the first secondary airbag being coupled with the axle assembly so that when the first portion is in the first position the first primary airbag is compressed and the first secondary airbag is expanded and when the first portion is in the second position the first primary airbag is expanded and the first secondary airbag is compressed.

3. A vehicle suspension system comprising:
a first wheel and a spaced apart second wheel;
an axle assembly comprising:
a central body having a first end and an opposing second end, the first end being forked so as to include a pair of first support arms, the second end being forked so as to include a pair of second support arms;
a first transfer arm having a first end hingedly coupled to the first wheel and an opposing second end hingedly coupled to the first end of the central body at a location between the first support arms, the first transfer arm being movable between a first position and a second position; and
a second transfer arm having a first end hingedly coupled to the second wheel and an opposing second end hingedly coupled to the second end of the central body at a location between the second support arms, the second transfer arm being movable between a first position and a second position;
a first primary airbag having a compartment with a volume and being located between the first transfer arm and one of the first support arms;
a first secondary airbag having a compartment with a volume and being located between the first transfer arm and the other of the first support arms so that when the first transfer arm is in the first position the first primary airbag is compressed and the first secondary airbag is expanded and when the first transfer arm is in the second position the first primary airbag is expanded and the first secondary airbag is compressed;
a second primary airbag having a compartment with a volume and being located between the second transfer arm and one of the second support arms;
a second secondary airbag having a compartment with a volume and being located between the second transfer arm and the other of the second support arms;
a first gas line extending in fluid communication between the compartment of the first primary airbag and the compartment of the second secondary airbag; and
a second gas line extending in fluid communication between the compartment of the second primary airbag and the compartment of the first secondary airbag.

4. The vehicle suspension system as recited in claim 3, further comprising:
the volume of the compartment of the first secondary airbag being smaller than the volume of the compartment of the second primary airbag; and
the volume of the compartment of the second secondary airbag being smaller than the volume of the compartment of the first primary airbag.

5. The vehicle suspension system as recited in claim 3, wherein the first primary air bag is compressed directly between the first transfer arm and the one first support arm when the first transfer arm is in the first position.

6. The vehicle suspension system as recited in claim 3, wherein the central body connects with the forked first end centrally between the pair of first support arms and connects with the forked second end centrally between the pair of second support arms.

7. The vehicle suspension system as recited in claim 3, wherein the central body connects with the forked first end in longitudinal alignment with one of the first support arms and connects with the forked second end in longitudinal alignment with one of the second support arms.

8. The vehicle suspension system as recited in claim 3, further comprising an extension arm extending between the first primary air bag and either the first transfer arm or one of the first support arms.

9. The vehicle suspension system as recited in claim 8, further comprising an extension arm extending between the first secondary air bag and either the first transfer arm or one of the first support arms.

10. The vehicle suspension system as recited in claim 3, wherein the first primary air bag or the first secondary air bag is hingedly coupled to either the first transfer arm or one of the first support arms.

11. The vehicle suspension system as recited in claim 3, wherein the pair of first support arms are disposed in substantially parallel alignment.

12. A vehicle suspension system comprising:
a first wheel and a spaced apart second wheel;
an axle assembly comprising:
a central body having a first end that terminates at a first terminus and an opposing second end that terminates at a second terminus;
a first pair of risers that include an upper riser and a lower riser that outwardly project from opposing sides of the first end of the central body at a location spaced back from the first terminus;
a second pair of risers that include an upper riser and a lower riser that outwardly project from opposing sides of the second end of the central body at a location spaced back from the second terminus;

a first connecting arm having the first wheel coupled thereto;

a second connecting arm having the second wheel coupled thereto;

a first pair of transfer arms including:

an upper transfer arm hingedly connected to the upper riser of the first pair of risers and hingedly connected to the first connecting arm, the upper transfer arm being movable between a first position and a second position; and an lower transfer arm hingedly connected to the lower riser of the first pair of risers and hingedly connected to the first connecting arm, the lower transfer arm being movable between a first position and a second position;

a second pair of transfer arms including:

an upper transfer arm hingedly connected to the upper riser of the second pair or risers and hingedly connected to the second connecting arm; and a lower transfer arm hingedly connected to the lower riser of the second pair or risers and hingedly connected to the second connecting arm;

a first primary airbag having a compartment with a volume and being located between the first end of the central body and the lower transfer arm of the first pair of transfer arms;

a first secondary airbag having a compartment with a volume and being located between the first end of the central body and the upper transfer arm of the first pair of transfer arms so that when the upper and lower transfer arms of the first transfer arms are in the first position the first primary airbag is compressed and the first secondary airbag is expanded and when the upper and lower transfer arms of the first transfer arms are in the second position the first primary airbag is expanded and the first secondary airbag is compressed;

a second primary airbag having a compartment with a volume and being located between the second end of the central body and the lower transfer arm of the second pair of transfer arms;

a second secondary airbag having a compartment with a volume and being located between the second end of the central body and the upper transfer arm of the second pair of transfer arms;

a first gas line extending in fluid communication between the compartment of the first primary airbag and the compartment of the second secondary airbag; and a second gas line extending in fluid communication between the compartment of the second primary airbag and the compartment of the first secondary airbag.

13. The vehicle suspension system as recited in claim 12, further comprising:

the volume of the compartment of the first secondary airbag being smaller than the volume of the compartment of the second primary airbag; and the volume of the compartment of the second secondary airbag being smaller than the volume of the compartment of the first primary airbag.

14. The vehicle suspension system as recited in claim 12, wherein the first primary air bag is compressed between the central body and the lower transfer arm of the first pair of transfer arms when the lower transfer arm is in the first position.

15. The vehicle suspension system as recited in claim 12, further comprising an extension arm extending between the first primary air bag and either the lower transfer arm of the first pair of transfer arms or the central body.

16. The vehicle suspension system as recited in claim 12, further comprising an extension arm extending between the first secondary air bag and either the upper transfer arm of the first pair of transfer arms or the central body.

17. The vehicle suspension system as recited in claim 12, wherein the first primary air bag or the first secondary air bag is hingedly coupled to either one of the first transfer arms or to the central body.

18. The vehicle suspension system as recited in claim 12, wherein the first wheel is coupled to the first connecting arm by a stem extending therebetween.

\* \* \* \* \*

UNITED STATES PATENT AND TRADEMARK OFFICE
CERTIFICATE OF CORRECTION

PATENT NO.        : 8,789,834 B1                                                Page 1 of 1
APPLICATION NO.   : 13/595368
DATED             : July 29, 2014
INVENTOR(S)       : Turner It is certified that error appears in the above-identified patent and that said Letters Patent is hereby corrected as shown below:

In the Specification

Column 3
Line 31, change "raising second" to --raising second end--
Line 52, change "which rests of" to --which rests on--

Column 4
Line 12, change "appreciated that that" to --appreciated that--

Signed and Sealed this
Fourteenth Day of July, 2015

Michelle K. Lee
*Director of the United States Patent and Trademark Office*